(12) United States Patent
Wang

(10) Patent No.: US 11,716,202 B2
(45) Date of Patent: Aug. 1, 2023

(54) TECHNIQUES FOR SECURE BLOCKCHAIN ROUTING

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 81 days.

(21) Appl. No.: 17/391,447

(22) Filed: Aug. 2, 2021

(65) Prior Publication Data

US 2021/0359860 A1 Nov. 18, 2021

Related U.S. Application Data

(63) Continuation of application No. 16/604,056, filed as application No. PCT/US2017/032762 on May 15, 2017, now Pat. No. 11,108,561.

(51) Int. Cl.
*H04L 45/74* (2022.01)
*H04L 9/06* (2006.01)
(Continued)

(52) U.S. Cl.
CPC .......... *H04L 9/3239* (2013.01); *H04L 9/0637* (2013.01); *H04L 45/64* (2013.01); *H04L 9/50* (2022.05)

(58) Field of Classification Search
CPC ..... H04L 45/64; H04L 9/0637; H04L 9/3239; H04L 9/50; H04L 2209/56
See application file for complete search history.

(56) References Cited

U.S. PATENT DOCUMENTS

| 11,108,561 | B2 * | 8/2021 | Wang ................. H04L 9/0637 |
| 2017/0048209 | A1 | 2/2017 | Lohe et al. |

(Continued)

FOREIGN PATENT DOCUMENTS

| CN | 106656784 A | 5/2017 |
| KR | 101628624 B1 | 6/2016 |

OTHER PUBLICATIONS

Yang ("Mesh Networking with Bitcoin Research Project" Feb. 18, 2016, pp. 1-31 (Year: 2016).*

(Continued)

*Primary Examiner* — Melvin C Marcelo
*Assistant Examiner* — Natali Pascual Peguero
(74) *Attorney, Agent, or Firm* — Kilpatrick Townsend & Stockton LLP

(57) ABSTRACT

Described herein are systems and methods for providing secure blockchain routing utilizing an extended blockchain protocol. In some embodiments, a blockchain routing node may join an overlay network including a plurality of blockchain routing nodes. The blockchain routing node may receive a plurality of forwarding tables from the plurality of blockchain routing nodes in accordance with an extended blockchain protocol. The blockchain routing node may determine a routing table for the overlay network based at least on part on the plurality of forwarding tables. In some embodiments, the blockchain routing node may route a payload message to a destination blockchain routing node in the overlay network in accordance with the determined routing table.

20 Claims, 7 Drawing Sheets

(51) Int. Cl.
*H04L 9/32* (2006.01)
*H04L 45/64* (2022.01)
*H04L 9/00* (2022.01)

(56) References Cited

U.S. PATENT DOCUMENTS

2017/0103468 A1  4/2017  Orsini et al.
2017/0111385 A1  4/2017  Madhu et al.

OTHER PUBLICATIONS

SG11201908957X , "Further Written Opinion", dated Oct. 4, 2022, 7 pages.
CN201780090818.9 , "Office Action", dated Dec. 16, 2021, 11 pages.
CN201780090818.9 , "Office Action", dated Jul. 5, 2021, 17 pages.
U.S. Appl. No. 16/604,056 , "Corrected Notice of Allowability", dated Jul. 9, 2021, 2 pages.
U.S. Appl. No. 16/604,056 , "Corrected Notice of Allowability", dated Jun. 23, 2021, 2 pages.
U.S. Appl. No. 16/604,056 , "Non-Final Office Action", dated Oct. 7, 2020, 10 pages.
U.S. Appl. No. 16/604,056 , "Notice of Allowance", dated May 4, 2021, 5 pages.
Croman et al., "On Scaling Decentralized Blockchains", International Conference on Financial Cryptography and Data Security, dated Feb. 2016, 16 pages.
EP17909735.7 , "Extended European Search Report", dated Mar. 27, 2020, 6 pages.
EP17909735.7 , "Office Action", dated Jun. 1, 2021, 6 pages.
Lua et al., "A Survey and Comparison of Peer-to-Peer Overlay Network Schemes", Institute of Electrical and Electronics Engineers Communications Surveys and Tutorials, vol. 7, No. 2, 2005, 22 pages.
PCT/US2017/032762 , "International Preliminary Report on Patentablity", dated Nov. 28, 2019, 9 pages.
PCT/US2017/032762 , "International Search Report and Written Opinion", dated Dec. 22, 2017, 12 pages.
Prihodko et al., "Flare: An Approach to Routing in Lightning Network", Bitfury Group, White Paper, dated Jul. 7, 2016, pp. 1-40.
SG11201908957X , "Written Opinion", dated Apr. 27, 2021, 6 pages.
Yang , "Mesh Networking With Bitcoin Research Project", Available Online at: http://pub.tik.ee.ethz.ch/students/2015-HS/SA-2015-34.pdf, Feb. 18, 2016, 31 pages.

\* cited by examiner

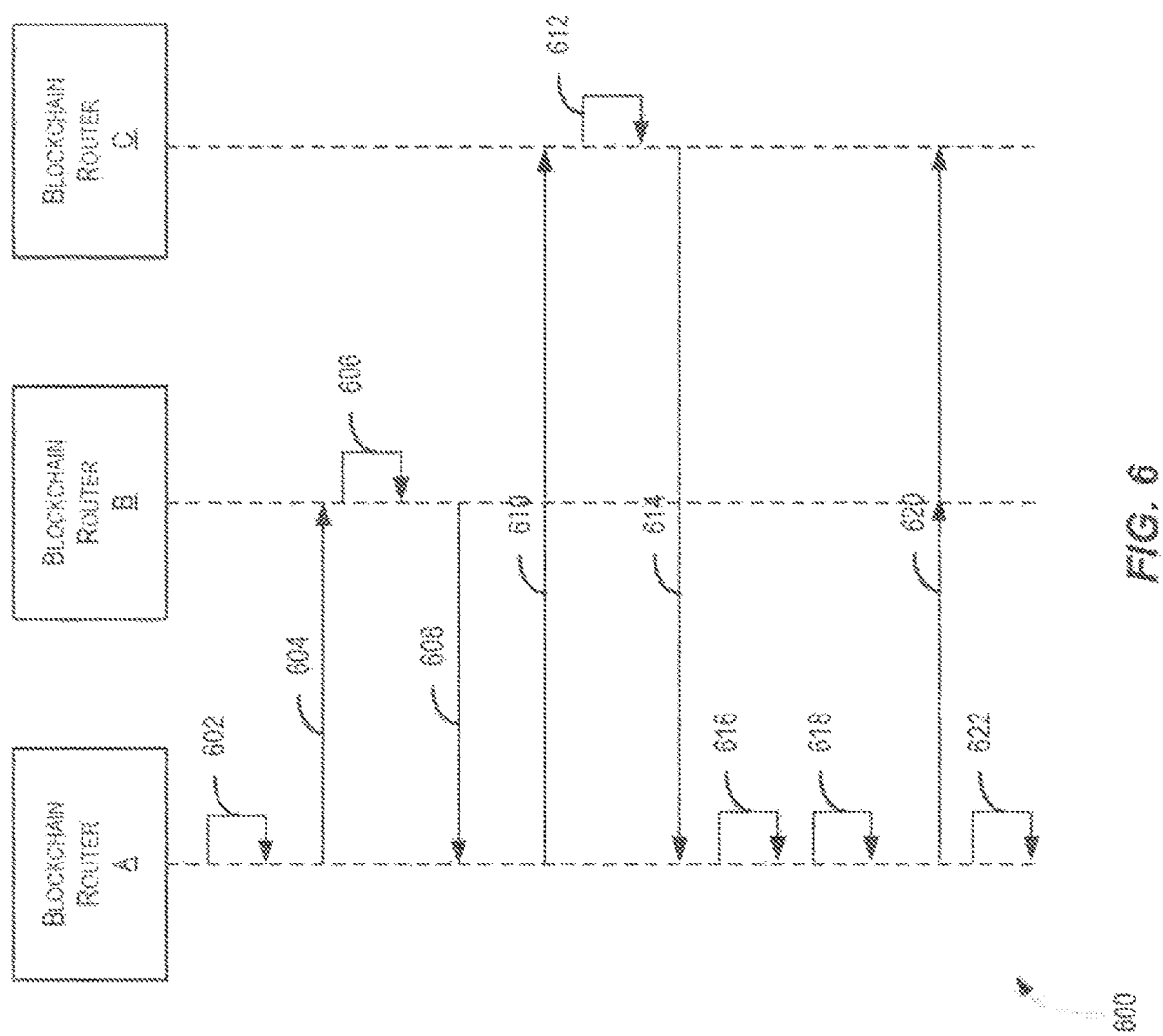

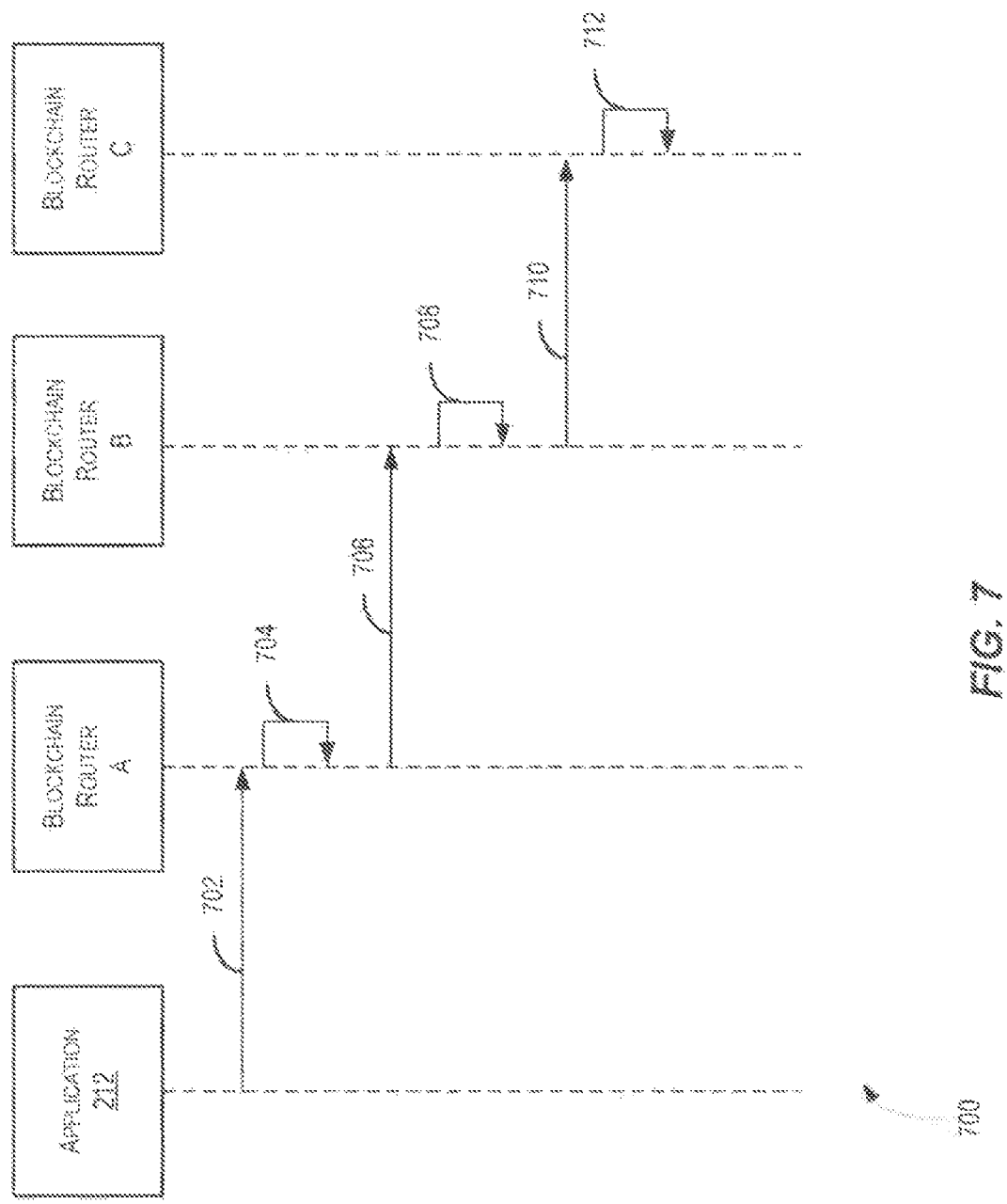

TECHNIQUES FOR SECURE BLOCKCHAIN ROUTING

CROSS-REFERENCES TO RELATED APPLICATIONS

This application is a continuation application of U.S. patent application Ser. No. 16/604,056, filed on Oct. 9, 2019, which is a National Stage of International Application No. PCT/US2017/032762, filed on May 15, 2017, which are herein incorporated by reference in their entirety for all purposes.

BACKGROUND

Blockchain technology is quickly expanding beyond the use of digital currencies. Currently, a blockchain is a transaction database shared by all nodes participating in a system based on a blockchain protocol. A blockchain may include a number of blocks of interaction records. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by a blockchain provider after it completes the block and the block is validated. A blockchain may be distributed, and a copy of the blockchain may be maintained at one or more locations. In some examples, the blockchain can be used to verify transactions. The security of a blockchain may be obtained using a cryptographic scheme While blockchain technology enables a decentralized approach to database management, blockchain message payloads are still routed via the traditional centralized network approach (e.g., via the Internet). Generally, reliance on a relatively small set of corporations to provide communications flow within the Internet may bring disadvantages such as higher monetary costs, latency, and privacy and/or security issues, to name a few Embodiments of the invention address these and other problems, individually and collectively.

BRIEF SUMMARY

Embodiments of the invention are directed to techniques for secure blockchain routing. In some embodiments, an extended blockchain protocol may be utilized to implement message routing functionality. Such routing functionality may enable a blockchain routing system to maintain forwarding and/or routing tables, to determine routing costs, to select a particular route from many available routes, and to effectuate the routing of a data message to an intended destination.

One embodiment of the invention is directed to a method comprising joining, by a blockchain routing node, an overlay network including a plurality of blockchain routing nodes. The method may further comprise receiving, by the blockchain routing node, a plurality of single-node forwarding tables from the plurality of blockchain routing nodes in accordance with an extended blockchain protocol. The method may further comprise determining, by the blockchain routing node, a routing table for the overlay network based at least on part on the plurality of single-node forwarding tables. The method may further comprise routing, by the blockchain routing node, a payload message to a destination blockchain routing node in the overlay network in accordance with the determined routing table.

Another embodiment of the invention is directed to a blockchain routing node comprising a processor and a computer readable medium coupled to the processor, the computer readable medium comprising instructions that, when executed, cause the processor to perform operations. The execution of the instructions cause the blockchain routing node to join an overlay network including a plurality of blockchain routing nodes. The execution of the instructions further cause the blockchain routing node to receive a plurality of single-node forwarding tables from the plurality of blockchain routing nodes in accordance with an extended blockchain protocol. The execution of the instructions further cause the blockchain routing node to determine a routing table for the overlay network based at least on part on the plurality of single-node forwarding tables. The execution of the instructions further cause the blockchain routing node to route a payload message to a destination blockchain routing node in the overlay network in accordance with the determined routing table.

Another embodiment of the invention is directed to a system comprising a plurality of blockchain routing nodes, the plurality of blockchain routing nodes individual comprising a processor and a computer readable medium coupled to the processor, the computer readable medium comprising instructions that, when executed, cause the processor to perform operations. The execution of the instructions cause the blockchain routing node to join an overlay network including a plurality of blockchain routing nodes. The execution of the instructions further cause the blockchain routing node to receive a plurality of single-node forwarding tables from the plurality of blockchain routing nodes in accordance with an extended blockchain protocol. The execution of the instructions further cause the blockchain routing node to determine a routing table for the overlay network based at least on part on the plurality of single-node forwarding tables. The execution of the instructions further cause the blockchain routing node to route a payload message to a destination blockchain routing node in the overlay network in accordance with the determined routing table.

These and other embodiments of the invention are described in further detail below.

BRIEF DESCRIPTION OF THE DRAWINGS

FIG. 6 depicts a flow diagram illustrating a process for managing a routing table utilizing a secure blockchain routing protocol according to some embodiments; and FIG. 7 depicts a flow diagram illustrating a process for performing message routing with a secure blockchain routing protocol in accordance with at least some embodiments

DETAILED DESCRIPTION

Figure 1:
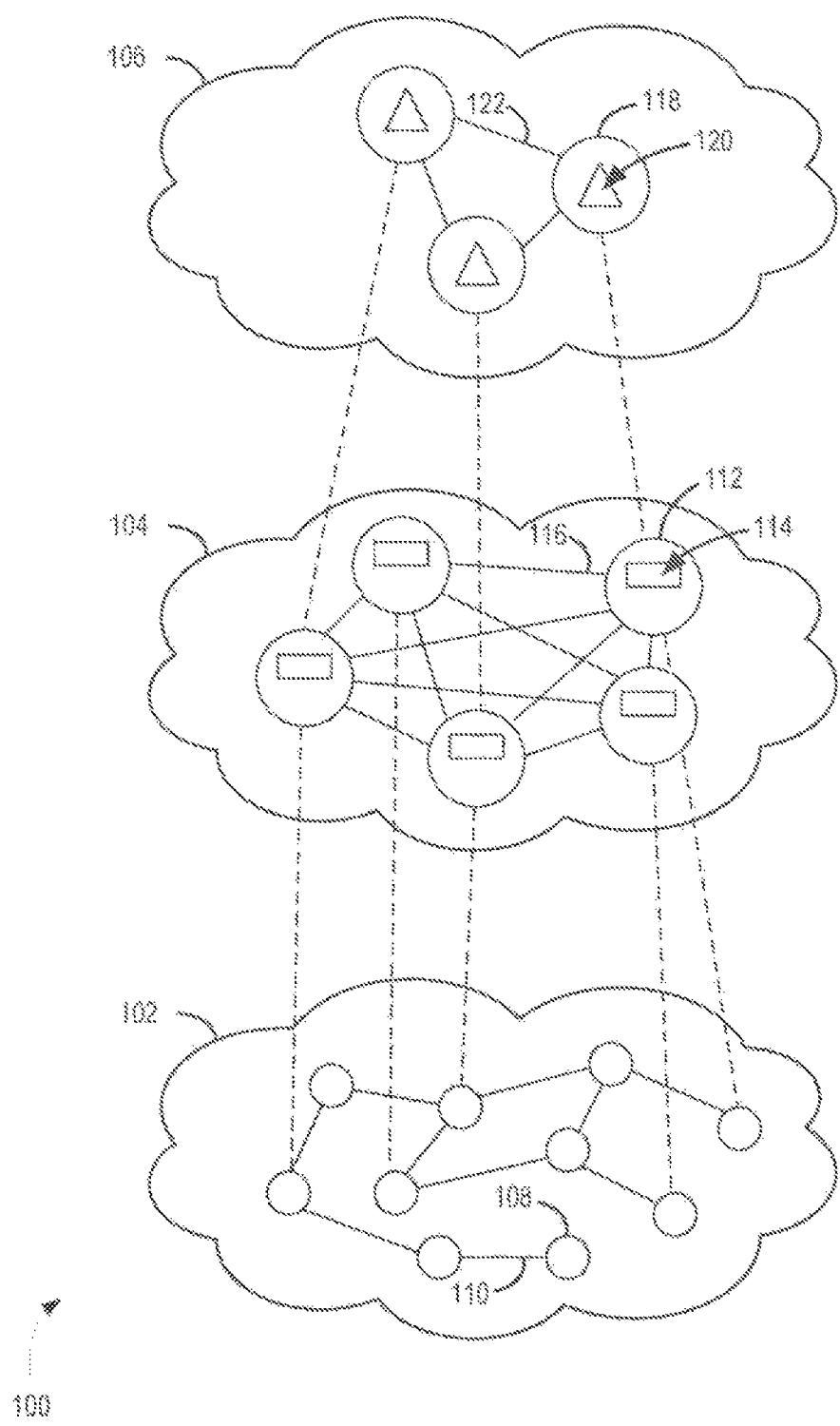
FIG. 1 depicts an example system for implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "blockchain router" (also referred to as a "blockchain routing node") can be any suitable computing device or software module that may be configured to perform routing functions utilizing a blockchain protocol A blockchain routing node may be configured to transmit and receive data via a wired or wireless data network (e.g. 3G, 4G or similar networks), Wi-Fi, Wi-Max, or any other communication medium that may provide access to a network. A blockchain routing node may comprise any suitable hardware and software for performing routing functions, and may also include multiple devices or components (e.g., when a device has access to a network by tethering to another device—i.e. using the other device as a modem—both electronic devices taken together may be considered a blockchain routing node). A blockchain routing node may be configured to perform functions such as maintaining forwarding and/or routing tables, determining routing costs, selecting particular routes from many available routes, and facilitating or effecuating the routing of a data message to an intended destination. In some examples, the blockchain provider node may be configured to manage one or more blockchain ledgers. Thus, in some embodiments, it is contemplated that blockchain and routing management functionality may be commonly performed by a blockchain routing node.

A "blockchain provider" (also referred to as a "blockchain provider node") can be an computing device configured to provide blockchain functionality. The blockchain provider can include a single device, multiple devices, or one or more software modules configured to maintain aspects of a blockchain (e.g., one or more ledgers, etc.). In some examples, the blockchain provider may additionally provide routing functionality. Thus, in some embodiments, it is contemplated that blockchain and routing management functionality may be commonly performed by a blockchain provider.

An "extended blockchain protocol" may define message formats and message exchange rules for performing network routing functionality. The extended blockchain protocol may include functionality of a standard blockchain protocol that does not define network routing functionality A "forwarding table request message" is an example of a message defined by an extended blockchain protocol. In some embodiments, a forwarding table request message may be utilized to request forwarding table information from another computing device. In some embodiments, a forwarding table request message may be utilized to request an entire forwarding table from another computing device.

A "forwarding table response message" is an example of a message defined by an extended blockchain protocol. In some embodiments, a forwarding table response message may be utilized to provide forwarding table information to another computing device. In some embodiments, a forwarding table response message may be utilized to provide an entire forwarding table to another computing device.

"Forwarding table information" may include any suitable data associated with a forwarding table. For example, forwarding table information may include, but is not limited to, a destination, a next hop, and performance data (e.g., a metric and a cost) associated with a particular network route between two computing devices of a network. In some embodiments, a metric may correspond to a latency value, a processing value quantifying processing costs, or the like. In some embodiments, a "cost" may correspond to a monetary cost associated with utilization of the network route.

A "routing table request message" is an example of a message defined by an extended blockchain protocol. In some embodiments, a routing table request message may be utilized to request routing table information from another computing device. In some embodiments, a routing table request message may be utilized to request an entire routing table from another computing device.

A "routing table response message" is an example of a message defined by an extended blockchain protocol. In some embodiments, a routing table response message may be utilized to provide routing table information to another computing device. In some embodiments, a routing table response message may be utilized to provide an entire routing table to another computing device.

"Routing table information" may include any suitable data associated with a routing table. For example, routing table information may include, but is not limited to, a destination, a next hop, and performance data (e.g., a metric and a cost) associated with a particular network route between two computing devices of a network.

A "computing device" can be any suitable device or software module that is configured to process data. In some embodiments, a computing device may include communication capabilities such as using a mobile phone (wireless) network, wireless data network (e.g. 3G, 4G or similar networks), Wi-Fi, Wi-Max, or any other communication medium that may provide access to a network such as the Internet, an overlay network, or the like. Examples of computing devices include mobile phones (e.g. cellular phones), PDAs, tablet computers, net books, laptop computers, personal music players, hand-held specialized readers, server computers, etc. A computing device may comprise any suitable hardware and software for performing such functions, and may also include multiple devices or components (e.g. when a device has remote access to a network by tethering to another device—i.e. using the other device as a modem—both electronic devices taken together may be considered a single computing device).

A "blockchain ledger" is a record of electronic transactions maintained according to a blockchain protocol. A full copy of a blockchain ledger may include every transaction ever executed by the system Each entry (e.g., block) in the ledger may contain a hash of the previous entry. This has the effect of creating a chain of blocks from the genesis block to a current block. Each block is guaranteed to come after the previous block chronologically because the previous block's hash would otherwise not be known. Each block is also computationally impractical to modify once it has been in the chain for a while because every block after it would also have to be regenerated. These properties make a blockchain ledger relatively secure and tamper resistant An "overlay network" may be a computer network that is built on top of another network. Nodes in an overlay network can be thought of as being connected by virtual or logical links, each of which corresponds to a path, perhaps through many physical links, in the underlying network. For example, distributed systems such as peer-to-peer networks and client-server applications are often overlay networks because their nodes run on top of the Internet. An overlay network, as discussed herein, may include one or more computing nodes (e.g., blockchain routing nodes, computing nodes for maintaining blockchain ledgers, etc.) for performing blockchain functionality including, but not limited to, managing one or more blockchain ledgers, determining routing costs, selecting particular routes from many available routes, and facilitating or effecuating the routing of a data message to an intended destination.

A "decentralized network" is intended to refer to a network in which no one single computing device or software module has control over all of the processing of the network. A "centralized network" is intended to refer to a network in which a single computing device or node (or a relatively small number of the same) control the processing of the network. Between the two, a decentralized network may be less likely to fail accidentally because it relies on many separate components that are not likely to fail at once. Additionally, decentralized systems are more expensive to attack and destroy or manipulate than centralized networks because decentralized networks lack sensitive central points that can be attacked at much lower cost than the economic size of the surrounding system. Additionally, it may be significantly more difficult for participants in a decentralized networks to collude to act in ways that benefit them at the expense of other participants.

A "centralized routing model" may refer to a routing model that is centrally effectuated using a centralized database (e.g., a single database maintained by a single entity). In other words, the routing table in a centralized routing model is stored at a single "central" node, which may be consulted when other nodes need to make a routing decision.

A "distributed routing model" may refer to a routing model that is implemented using a distributed database, or in other words, a database for which a copy is distributed and maintained on many (or all) of the nodes/devices of a network.

A "messaging protocol" may be a set of rules for exchanging messages between two computing devices. In some cases, a messaging protocol may include conditions upon which actions are to be performed. In some embodiments, a message protocol may include a specification that defines a bitwise implementation for various message formats of the messaging protocol.

A "routing table" may be a data table that lists available routes within a network, and in some cases, metrics (distances) associated with those routes. A routing table contains information about the topology of the network to which it refers. The construction of routing tables is the primary goal of traditional routing protocols.

A "forwarding table" may include a subset of entries of a routing table. A forwarding table may include routes that have been determined to be optimal (e.g., based on latency, cost, or other suitable measures) from multiple available routes.

A "peer-to-peer network" refers to a network that includes peer nodes/devices simultaneously acting as "clients" and "servers" to other nodes/devices in the network. The peer-to-peer network arrangement differs from the client-server model where communication is usually to and from a central server. Peer-to-peer networks may implement some form of virtual overlay network on top of the physical network topology, where the nodes in the virtual overlay form a subset of the nodes in the physical network. Data may still exchanged directly over the underlying protocol (e.g., TCP/IP) network, but at an application layer peers are able to communicate with each other directly, via the logical overlay links (each of which corresponds to a path through the underlying physical network).

A "peer discovery process" may refer to operations performed to discover other peers within a network. The peer discovery process may include any suitable operation for performing such a task such as referring to a list of nodes from a previous connection to the network (e.g., a locally stored list), requesting and/or receiving a Domain Name Server (DNS) seed, or transmitting a request for identification to the network. In some embodiments, a DNS seed resolves to a list of IP addresses known to be running nodes. Additionally or alternative, the process may include referring to a static, hard-coded, locally-stored peer list in order to identify one or more peers of a network.

An "application" may be computer code or other data stored on a computer readable medium (e.g. memory element or secure element) that may be executable by a processor to complete a task Details of some embodiments of the present invention will now be described.

FIG. 1 depicts an example system 100 for implementing at least some embodiments of the current disclosure. In FIG. 1, may include network 102, network 104 and network 106. Network 102 may include one or more computing devices (e.g., computing device 108). The computing device 108 may be in communication with one or more other computing nodes of network 102 via communication connection 110 for example. The network 102 may be an example of a global network (e.g., the Internet) that may provide a variety of information and communication facilities, consisting of interconnected networks using standardized communication protocols (e.g., TCP/IP, HTTP, etc.) By way of example, data may be transmitting between the computing devices of network 102 using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

The computing device 108 may be any electronic device configured to perform at least one primary function. In one illustrative configuration, the computing device 108 may include at least one memory and one or more processing units (or processor(s)) The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described.

The memory of computing device 108 may individually store program instructions that are loadable and executable on the processor(s), as well as data generated during the execution of these programs. Depending on the configuration and type of user computing device, the memory may be volatile (such as random access memory (RAM)) and/or non-volatile (such as read-only memory (ROM), flash memory, etc.). The computing device 108 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

Turning to the contents of the memory, the memory may include an operating system and one or more application programs, modules, or services for implementing the features of a centralized network. Additionally, the memory may store configuration information such as, but not limited to, routing tables, forwarding tables, and the like. The network 102 may be an example of a centralized network in which routing is processed by a single, or a subset, of the computing devices in the network 102.

In some embodiments, the computing device 108 may include a communication interface configured to enable communication between the computing device 108 and another computing device (e.g., another computing device having access to the network 102). Examples of communication interface may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication interface may include an infrared communication device. In some embodiments, the communication interface may include both long range and short range communication means. For example, the communication interface may include an antenna configured to connect to a cellular network in order to enable communication with various other components of the depicted architecture In some examples, the communication interface may utilize physical connections between computing devices of the network 102 to transmit and receive data Network 104 may include one or more computing devices (e.g., computing device 112) configured to perform blockchain management functionality The computing device 112 may be in communication with one or more other computing nodes of network 104 via communication connection 116 for example. The network 104 may be an example of an overlay network that may provide a variety of information and communication facilities, consisting of interconnected networks using a standard messaging protocol. By way of example, data may be transmitting between the computing devices of network 104 using a blockchain protocol. In some examples, the computing devices of network 104 may be the same, or a subset, of the computing devices of the network 102. Although it may be the case that at least one computing device of network 104 does not participate in network 102.

The computing device 112 may be any electronic device configured to perform at least one primary function. In one illustrative configuration, the computing device 112 may include at least one memory and one or more processing units (or processor(s)). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described.

The memory of computing device 112 may individually store program instructions that are loadable and executable on the processor(s), as well as data generated during the execution of these programs. Depending on the configuration and type of user computing device, the memory may be volatile (such as random access memory (RAM)) and/or non-volatile (such as read-only memory (ROM), flash memory, etc.). The computing device 112 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

Turning to the contents of the memory, the memory may include an operating system and one or more application programs (e.g., the application 114), modules, or services for implementing the features of a system for managing blockchain ledgers. Additionally, the memory may store a copy of one or more database (e.g., one or more decentralized blockchain ledgers). The network 104 may be an example of a decentralized network in which blockchain ledger management is performed by each computing device of the network 104

In some embodiments, the computing device 112 may include a communication interface configured to enable communication between the computing device 112 and another computing device (e.g., another computing device having access to the network 104). Examples of communication interface may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication interface may include an infrared communication device. In some embodiments, the communication interface may include both long range and short range communication means. For example, the communication interface may include an antenna configured to connect to a cellular network in order to enable communication with various other components of the depicted architecture. In some examples, the communication interface may utilize physical connections between computing devices of the network 104 to transmit and receive data.

Network 106 may include one or more computing devices (e.g., computing device 118) configured to perform blockchain routing functionality. The computing device 118 may be in communication with one or more other computing nodes of network 106 via communication connection 122 for example. The network 106 may be an example of an overlay network that may provide a variety of information and communication facilities, consisting of interconnected networks using an extension of a standard blockchain protocol. The extended blockchain protocol may be utilized to perform routing operations within the network 106. In some examples, the computing devices of network 106 may be the same, or a subset, of the computing devices of the network 104. Although it may be the case that at least one computing device of network 106 does not participate in network 104 and/or network 102.

The computing device 118 may be any electronic device configured to perform at least one primary function. In one illustrative configuration, the computing device 118 may include at least one memory and one or more processing units (or processor(s)). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described.

The memory of computing device 118 may individually store program instructions that are loadable and executable on the processor(s), as well as data generated during the execution of these programs. Depending on the configuration and type of user computing device, the memory may be volatile (such as random access memory (RAM)) and/or non-volatile (such as read-only memory (ROM), flash memory, etc). The computing device 118 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

Turning to the contents of the memory, the memory may include an operating system and one or more application programs (e.g., the application 120), modules, or services for implementing the features of a system for performing routing operations according to an extended blockchain protocol. Additionally, the memory may store a copy of one or more database (e.g., one or more decentralized blockchain ledgers). The network 104 may be an example of a centralized network in which routing operations are performed by a single, or a subset, of the computing devices of network 106. The network 104 may alternatively depict a decentralized network in which routing operations are performed by each computing device of the network 106.

In some embodiments, the computing device 118 may include a communication interface configured to enable communication between the computing device 118 and another computing device (e.g., another computing device having access to the network 104). Examples of communication interface may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication interface may include an infrared communication device. In some embodiments, the communication interface may include both long range and short range communication means. For example, the communication interlace may include an antenna configured to connect to a cellular network in order to enable communication with various other components of the depicted architecture. In some examples, the communication interlace may utilize physical connections between computing devices of the network 118 to transmit and receive data.

Embodiments of one or more modules on the computing device 118 may be stored and executed from its memory. The memory may include an operating system and one or more modules configured to cause one or more processors to carry out instructions in accordance with at least some embodiments of the disclosure.

For simplicity of illustration, a certain number of computing devices are shown in FIG. 1. It is understood, however, that embodiments of the invention may include more than one of each computing device. In addition, some embodiments of the invention may include fewer than or greater than all of the computing device shown in FIG. 1

Figure 2:
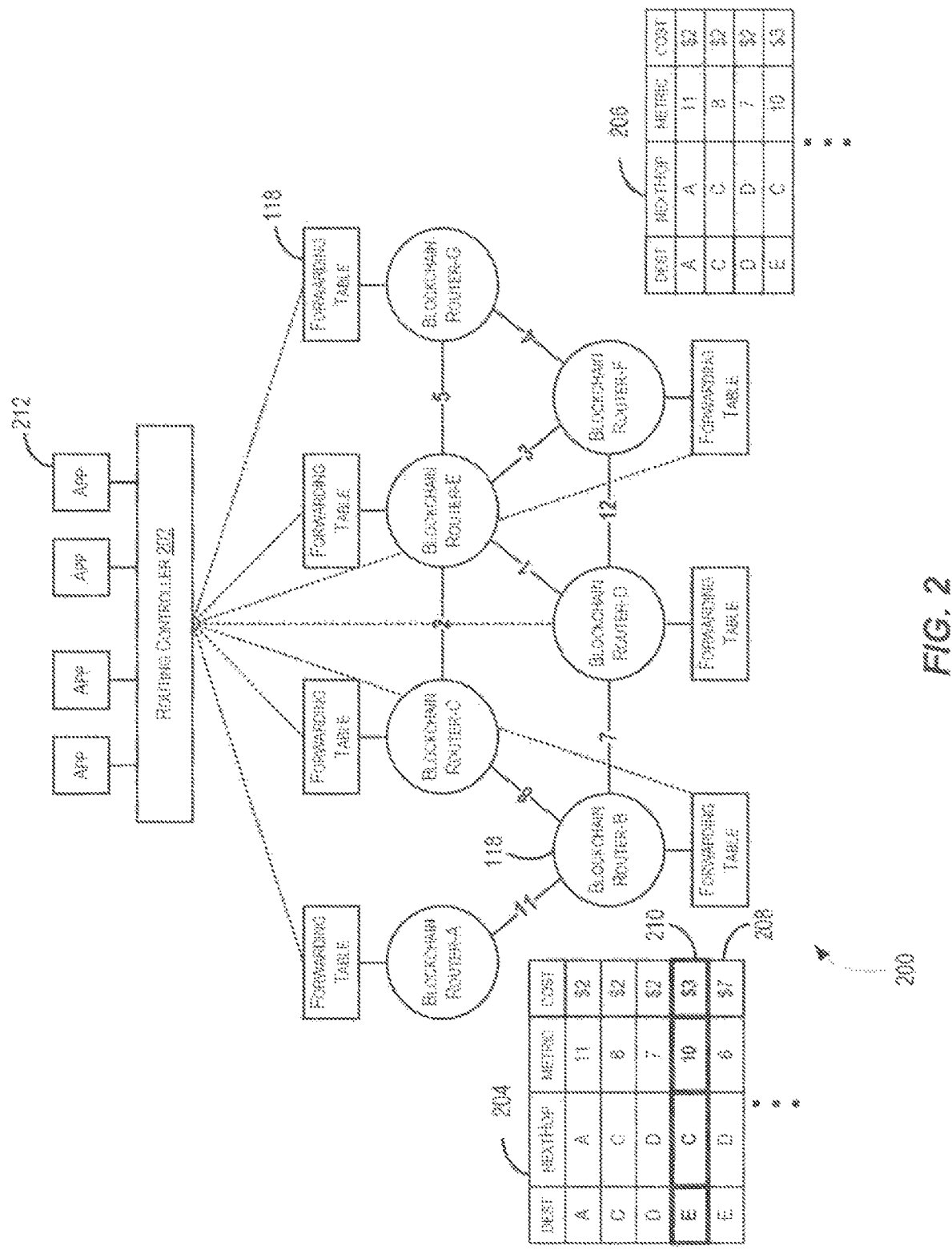
FIG. 2 depicts an example network of blockchain routers for implementing secure blockchain routing protocols in accordance with at least some embodiments.

FIG. 2 depicts an example network 200 of blockchain routers for implementing secure blockchain routing protocols in accordance with at least some embodiments. The network 200 may include any suitable number of blockchain routers (e.g., blockchain routers A-F). One or more of the blockchain routers may perform the functions of a routing controller 202 described herein. The blockchain routers A-F of FIG. 2 are intended to be examples of the computing device 118 of FIG. 1 participating in an overlay network (e.g., the network 106 of FIG. 1). Accordingly, the blockchain routers may individually be a device or software module configured to perform the routing functionality described herein and corresponding to the routing controller 202. In some examples, such functionality may be performed by an application (e.g., the application 120 of FIG. 1) operating on one or more of the blockchain routers of FIG. 2. In some embodiments, the blockchain routers may individually be a device or software module configured to perform blockchain ledger management. In these examples, such functionality may be performed by an application (e.g., the application 114 of FIG. 1) operating on one or more of the blockchain routers of FIG. 2. Although a particular number of blockchain routers are depicted in FIG. 2, it should be appreciated that any suitable number of blockchain routers may be utilized.

In some embodiments, each blockchain router (e.g., blockchain router B) may be configured to execute a peer discovery process in order to identify other blockchain routers in the network 200. The peer discovery process may be executed as part of a process executed by the blockchain router to join the network 200. The peer discovery process will be discussed further below with respect to FIG. 6.

In some embodiments, routing controller 202 may be configured to generate and maintain a routing table (e.g., the routing table 204) for the network 200. Routing table 204 is intended to depict an example routing table for the network 200. Routing table 204 may include more or fewer entries then those depicted in FIG. 2. Each entry in routing table 204 may include a suitable combination of a destination (e.g., an Internet Protocol (IP) address of a destination), a next hop address (e.g., an IP address of a next hop), a metric (depicting a processing cost, distance, latency, or the like), and a monetary cost. The routing table 204 may be viewed as a set of rules, in this case formatted in table format, that is used to determine where data packets traveling over the network 200 will be directed. The routing controller 202 may be configured to generate the routing table 204 from one or more data messages received from one or more of the blockchain routers of the network 200. Such data messages may be formatted according to an extended blockchain protocol that defines message formats and message exchange rules for performing the functionality of routing controller 202. The extended blockchain protocol utilized may include functionality of a standard blockchain protocol that does not define routing capabilities/functionality.

The routing controller 202 may additionally be configured to generate forwarding table 206 from the routing table 204. The forwarding table 206 may include some subset of the routes contained in the routing table 204. In some examples, the entries of the forwarding table 206 may include the most optimal routes determined from the routing table 204. For example, the forwarding table 206 may include a single optimal route between any pair of blockchain routers that constitutes the lowest total cost. In some examples, the optimal route may be one that has a lowest total cost as determined by multiplying a corresponding metric by a corresponding monetary cost.

By way of example, the routing table 204 indicates that there are two routes to destination E (e.g., route 208 and route 210). Accordingly, the routing controller 202 may be configured to calculate a total cost for route 208 (e.g., 8×7=56) and a total cost for the route 210 (e.g., 10×3=30). In this non-limiting example, the routing controller 204 may be configured to determine that route 210 is the most-optimal route to utilize based on route 210 having the lowest total cost. Accordingly, the routing controller 204 may include route 210 and exclude route 208 from the forwarding table 206. In some embodiments, the routing controller 204 may be configured to communicate one or more forwarding tables (e.g., the forwarding table 206) to one or more blockchain routers (or another suitable computing device) in the network 200.

In some embodiments, the routing controller 202 may be configured to facilitate data message routing within the network 200. The routing controller 202 may be configured to transmit and receive data messages formatted according to an extended blockchain protocol in order to transmit data message through the network 200 according to the routing table 204 and/or the forwarding table 206.

In some embodiments, the routing controller 202 may be configured to maintain one or more blockchain ledgers. By way of example, the routing controller 202 may maintain a blockchain ledger of the routing table 204 and/or the forwarding table 206. By maintaining the blockchain ledger(s), routing table 204 and/or forwarding table 206 may be made to be tamper resistant. By way of example, each update of the routing table 204 may be stored as a transaction in a blockchain ledger where each entry of the blockchain ledger contains the current routing table as well as a hash of the previous entries in the blockchain ledger corresponding to previous versions of the routing table. Accordingly, the blockchain ledger may be utilized to ensure that the routing table 204 has not been tampered with. Similarly, the routing controller 202 may be configured to maintain one or more blockchain ledgers for the forwarding table 206 (or any forwarding table) to ensure that the forwarding table 206 has not been tampered with.

In some embodiments, the network 200 may depict a centralized network in which a single computing device (e.g., the blockchain router B) may perform the functions of the routing controller 202. It may be the case in some embodiments, the generation and maintenance of the routing table 204 and/or the forwarding table 206 is performed by the routing controller 202 and distributed across some or all of the blockchain routers of the network 200. In other examples, the network 200 may depict a decentralized network in which each of the blockchain routers may perform the functions of the routing controller 202.

In some embodiments, tasks may be submitted by applications (e.g., application 212. The tasks submitted may be any suitable task requiring routing between two computing devices. The routing controller 202 may be configured to consult the forwarding table 206 to determine a next hop address for a data packet corresponding to the submitted task. The forwarding table 206, in some examples, may be associated with a current blockchain router at which the data packet was most recently received. The routing controller 202 may be configured to cause the data packet to be transmitted to the identified next hop address. This process may be repeated any suitable number of times until the data packet arrives at the intended destination.

Figure 3:
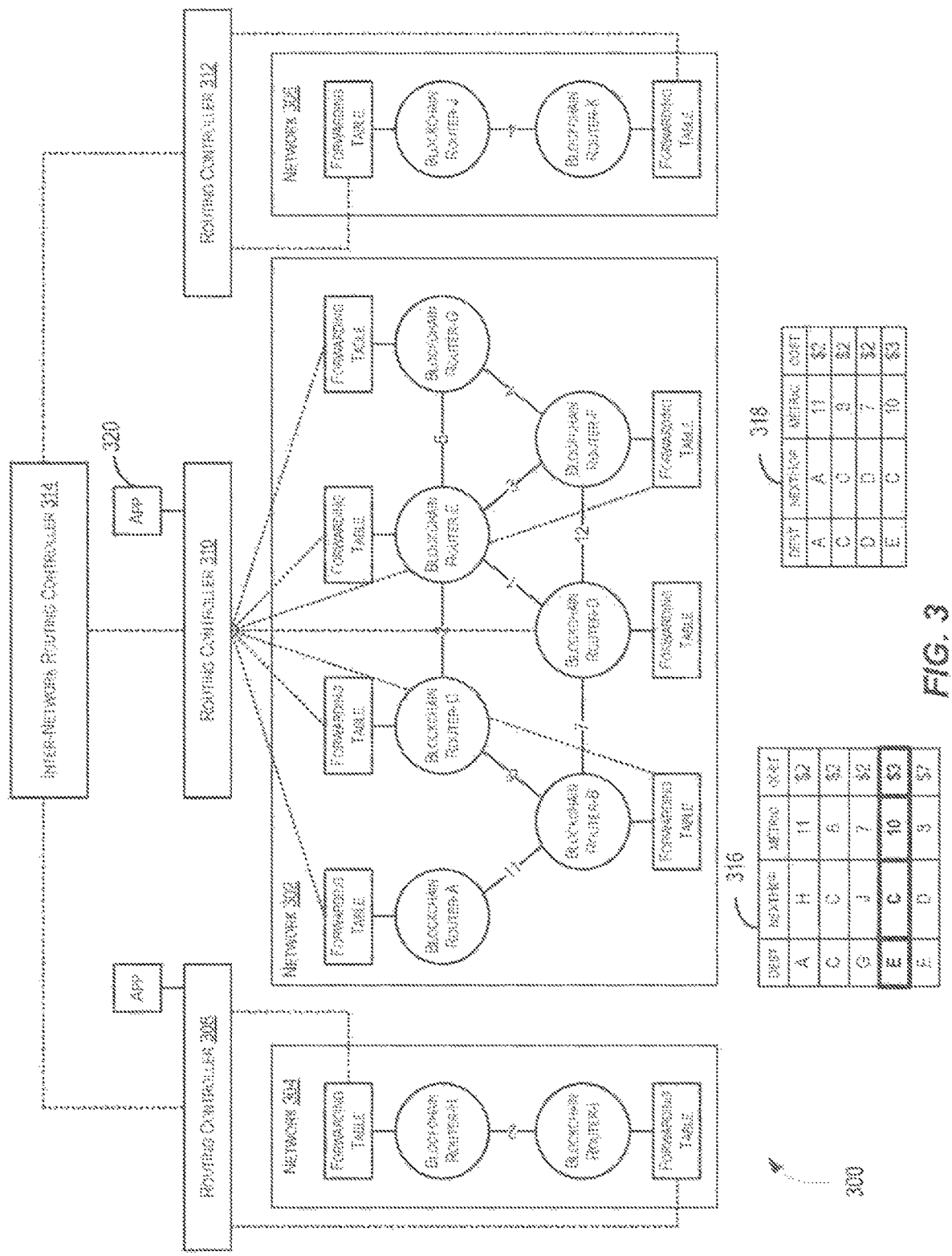
FIG. 3 depicts a system configured to implement secure blockchain routing protocols across networks in accordance with at least some embodiments.

FIG. 3 depicts a system 300 configured to implement secure blockchain routing protocols across networks (e.g., network 302, network 304, and network 306) in accordance with at least some embodiments. The network 302, the network 304 and the network 306 may individually include any suitable number of blockchain routers (e.g., blockchain routers A-F, blockchain routers H-I, and blockchain routers J-K, respectively). The network 302, the network 304, and the network 306 are each examples of the network 200 of FIG. 2. The blockchain routers of FIG. 3 are intended to be examples of the computing device 118 and each of the blockchain routers of FIG. 3 may be individually configured to act as a routing controller (e.g., routing controller 202 of FIG. 2).

By way of example, blockchain router H and/or blockchain router I may be configured to act as routing controller 308 (an example of routing controller 202 of FIG. 2) to perform routing functionality within network 304. Similarly, blockchain routers A-G (or some subset of the same) may be configured to act as routing controller 310 (e.g., routing controller 202) to perform routing functionality within network 302. Likewise, the blockchain router J and/or the blockchain router K may be configured to act as routing controller 312 (an example of routing controller 202) to perform routing functionality within network 306.

In some examples, the routing functionality of routing controller 308, routing controller 310, and/or routing controller 312 may be performed by an application (e.g., the application 120 of FIG. 1) operating on one or more of the blockchain routers of the corresponding network. In some embodiments, the blockchain routers of FIG. 3 may individually be a device or software module configured to perform blockchain ledger management. In these examples, such functionality may be performed by an application (e.g., the application 114 of FIG. 1) operating on one or more of the blockchain routers of FIG. 3. Although a particular number of blockchain routers are depicted within the networks of FIG. 3, it should be appreciated that any suitable number of blockchain routers may be utilized in any of the networks of FIG. 3.

In some embodiments, an inter-network routing controller 314 may be configured to generate and maintain a routing table (e.g., routing table 316) for routing networks (e.g., between the network 308, the network 310, and the network 312). Although three networks are depicted in FIG. 3, the inter-network routing controller 314 may be configured to perform routing functionality for any suitable number of networks. Routing table 316 is intended to depict an example routing table for routing data between the network 302, the network 304, and the network 306.

In some embodiments, routing table 316 may include more or fewer entries then those depicted in FIG. 3. Each entry in routing table 316 may include a suitable combination of a destination (e.g., an Internet Protocol (IP) address of a destination), a next hop address (e.g., an IP address of a next hop or a network identifier for a network), a metric (depicting a processing cost, distance, latency, or the like), and a monetary cost. The routing table 316 may be viewed as a set of rules, in this case formatted as a table, that is used to determine where data packets traveling between networks will be directed The inter-network routing controller 314 may be configured to generate the routing table 316 from one or more data messages received from routing controller 308, routing controller 310 and/or routing controller 312. Such data messages may be formatted according to an extended blockchain protocol that defines message formats and message exchange rules for performing the functionality of inter-network routing controller 314. The extended blockchain protocol utilized may include functionality of a standard blockchain protocol that does not define routing such capabilities/functionality.

The inter-network routing controller 314 may additionally be configured to generate forwarding table 318 from the routing table 316. The forwarding table 318 may include some subset of the entries (e.g., routes) contained in the routing table 316. In some examples, the entries of the forwarding table 318 may include the most optimal routes determined from the routing table 316. For example, the forwarding table 318 may include a single route between networks that constitutes the lowest total cost. In some examples, the optimal route may be one that has a lowest total cost as determined by multiplying a corresponding metric by a corresponding monetary cost as described above in connection with FIG. 2.

In some embodiments, the inter-network routing controller 314 may be configured to include the most optimal routes in forwarding table 318 and exclude other routes from the forwarding table 206. In some embodiments, the inter-network routing controller 314 may be configured to communicate one or more forwarding tables (e.g., the forwarding table 318) to one or more blockchain routers (or another is suitable computing device) acting as routing controller 308, routing controller 310, and/or routing controller 312.

In some embodiments, the inter-network routing controller 314 may be configured to facilitate data message routing between network 308, network 310, and network 312. The inter-network routing controller 314 may be configured to transmit and receive data messages formatted according to the extended blockchain protocol described herein in order to transmit data messages according to the routing table 316 and/or the forwarding table 318.

In some embodiments, the inter-network routing controller 314 may be configured to maintain one or more blockchain ledgers. By way of example, the inter-network routing controller 314 may maintain a blockchain ledger of the routing table 316 and/or the forwarding table 318. By maintaining the blockchain ledger(s), routing table 316 and/or forwarding table 318 may be made to be tamper resistant. By way of example, each update of the routing table 316 may be stored as a transaction in a blockchain ledger where each entry of the blockchain ledger contains the current routing table as well as a hash of the previous entries in the blockchain ledger corresponding to previous versions of the routing table. Accordingly, the blockchain ledger may be utilized to ensure that the routing table 316 has not been tampered with. Similarly, the inter-network routing controller 314 may be configured to maintain one or more blockchain ledgers for the forwarding table 318 (or any forwarding table) to ensure that the forwarding table 318 has not been tampered with.

In some embodiments, the system 300 may depict a centralized network in which a single computing device (e.g., the blockchain router B acting as routing controller 310) may perform the functions of the inter-network routing controller 314. In some embodiments, the generation and maintenance of the routing table 316 and/or the forwarding table 318 is performed by the routing controller 310 and distributed across some or all of the routing controllers (e.g., routing controller 308 and/or routing controller 312) of the system 300. In other examples, the system 300 may depict a decentralized network in which routing controller 308, routing controller 310, and routing controller 312 may each perform the functions of the inter-network routing controller 314.

In some embodiments, tasks may be submitted by applications (e.g., application 320. The tasks submitted may be any suitable task requiring routing between two networks (e.g., the network 302 and the network 304). The inter-network routing controller 314 may be configured to consult the forwarding table 318 to determine a next hop address for a data packet corresponding to the submitted task. The forwarding table 318, in some examples, may be associated with a particular network (e.g., the network 302) at which the data packet was most recently received. The entries within the forwarding table 318 may define next hops with respect to the particular network. The inter-network routing controller 314 may be configured to cause the data packet to be transmitted to the identified next hop address. This process may be repeated any suitable number of times until the data packet arrives at the intended network. In some embodiments, routing within the networks (e.g., the network 308) may be performed by a corresponding routing controller (e.g., the routing controller 308 for network 304, the routing controller 310 for network 302, and/or the routing controller 312 for network 306).

Figure 4:
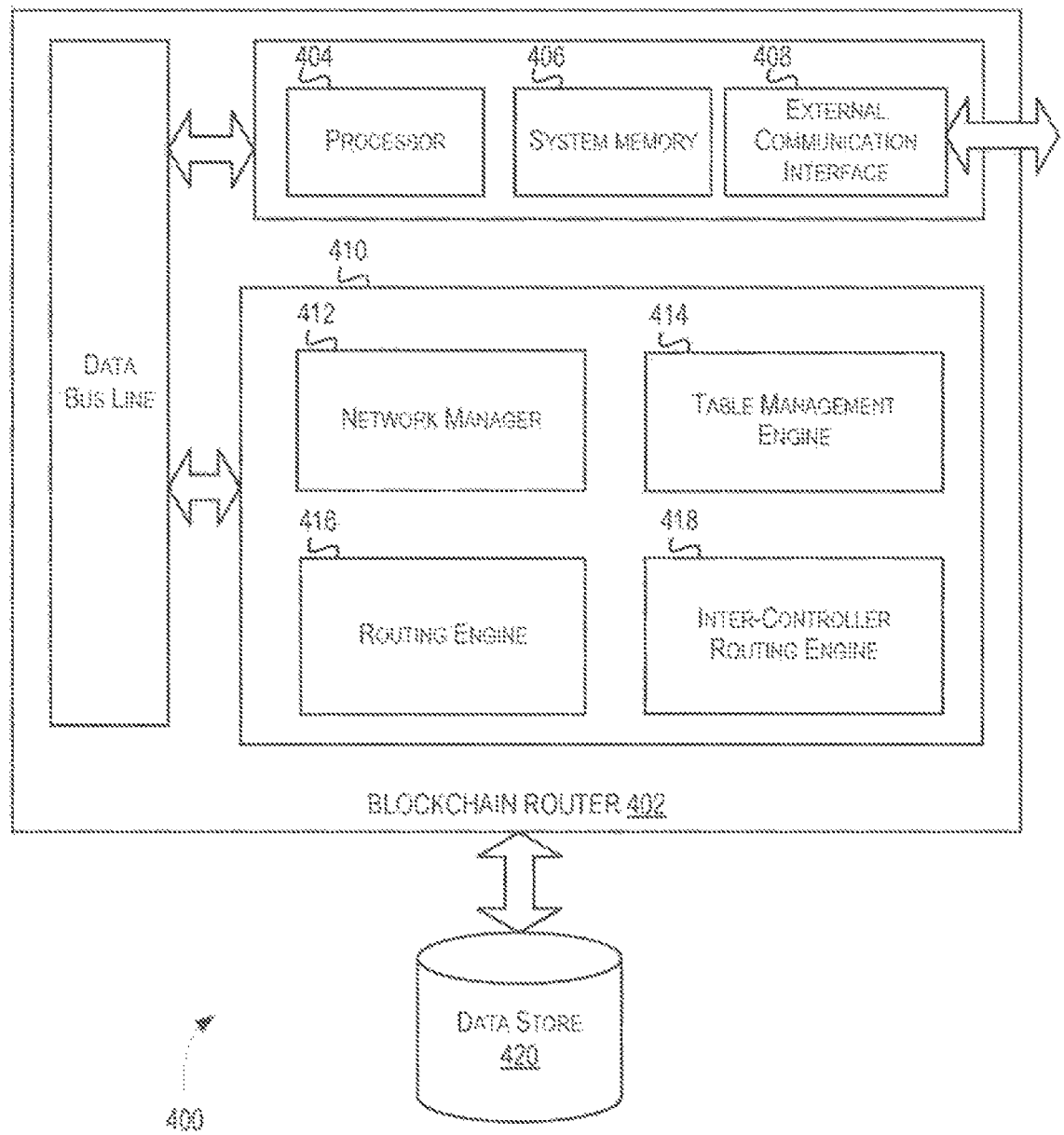
FIG. 4 depicts an illustrative example computer architecture of a blockchain router of FIGS. 2 and 3 configured to implement secure blockchain routing protocols in accordance with at least some embodiments.

FIG. 4 depicts an illustrative example computer architecture 400 of a blockchain router 402 (e.g., the blockchain routers of FIGS. 2 and 3) configured to implement secure blockchain routing protocols in accordance with at least some embodiments. As discussed above, the blockchain router 402 may perform any suitable combination of the routing functionality of the routing controllers and/or the inter-network routing controller of FIGS. 2 and 3. The routing functionality may be executed by an application (e.g., the application 114 and/or the application 120) stored in the computer readable medium 410 and operating on the blockchain router 402.

In some embodiments, the blockchain router 402 may comprise a processor 404 (or have access to said process), which may be coupled to a system memory 406 and an external communication interface 408. A computer readable medium 410 may also be operatively coupled to the processor 404. The computer readable medium 410 may comprise any suitable combination of software modules including a network manager 412, a table management engine 414, a routing engine 416, and an inter-controller routing engine 418. The modules of the blockchain router 502 may be software and/or hardware modules. It should be appreciated that any functionality described with respect to the modules of FIG. 4 may be combined to be performed by a single module or may be performed by a module that is external to the blockchain router 402.

The network manager 412, a component of the blockchain router 402, may be configured to cause the processor 404 to execute operations for joining a network (e.g., the network 106 of FIG. 1, an example of an overlay network for performing blockchain routing functionality). Such operations may include transmitting and receiving data messages corresponding to requests/response to join the network. The network manager 412 may be configured to cause the processor 404 to execute operations to discover peers within a network (e.g., the network 106). Such peer discovery operations are discussed further in connection with FIG. 6

In some embodiments, the table management engine 414, a component of the blockchain router 402, may be configured to cause the processor 404 to execute operations for maintaining one or more routing tables (e.g., the routing table 204 of FIG. 2 and/or the routing table 316 of FIG. 3) and/or one or more forwarding tables (e.g., the forwarding table 206 of FIG. 2 and/or the forwarding table 318 of FIG. 3). Such operations may include transmitting and receiving data messages to/from other blockchain routers (or other computing devices of the network) corresponding to requests/response for routing information. The routing information received by the table management engine 414 may specify particular routes known by a particular blockchain router and/or suitable computing device of the network. The route information may include a destination, next hop, metric, and monetary cost associated with each route known to the device. It should be appreciated that the routing information may contain any suitable information associated with a route.

In some embodiments, the table management engine 414 may be configured to cause the processor 404 to calculate a total cost associated with each route. As described above a total cost may be calculated by the table management engine 414 multiplying a metric by a monetary cost associated with the route, although other suitable methods for calculating a total cost may be utilized. After calculating the total cost for each route, the table management engine 414 may be configured to construct one or more forwarding tables (e.g., the forwarding table 206 and/or the forwarding table 318). In some embodiments, the table management engine 414 may be configured to provide the generated routing table(s) and/or forwarding table(s) to one or more other blockchain routers.

In some embodiments, the table management engine 414 may be configured to cause the processor 404 to store any suitable combination of one or more routing tables and/or one or more forwarding tables that the table management engine maintains. By way of example, the table management engine 414 may be configured to store such routing/forwarding tables in data store 420, a storage location configured to store such information. The data store 420 may exist as part of the memory 410 that is local to the blockchain router 402 and/or the data store 420 may be accessible to the processor 404 but exist external to the blockchain router 402.

In some embodiments, the routing engine 416, a component of the blockchain router 402, may be configured to cause the processor 404 to execute operations for transmitting a data message according to a routing table (e.g., the routing table 204 of FIG. 2) and/or one or more forwarding tables (e.g., the forwarding table 206). The routing engine 416 may be configured to modify the data message in any suitable manner in order to transmit the data message to the appropriate destination. By way of example, the routing engine 416 may be configured to cause the processor 404 to modify an address field of the message in order to direct the data message to the appropriate next hop address. Generally, the routing engine 416 may be configured to cause the processor to perform any suitable operations corresponding to a routing controller (e.g., the routing controller 302 of FIG. 3).

In some embodiments, the inter-controller routing engine 418, a component of the blockchain router 402, may be configured to cause the processor 404 to execute operations for transmitting a data message according to a routing table (e.g., the routing table 316 of FIG. 3) and/or one or more forwarding tables (e.g., the forwarding table 318 of FIG. 3). The inter-controller routing engine 418 may be configured to cause the processor 404 to modify the data message in any suitable manner in order to transmit the data message to the appropriate destination. By way of example, the inter-controller routing engine 418 may be configured to cause the processor 404 to modify an address field of the message in order to direct the data message to the appropriate next hop address. Generally, the inter-controller routing engine 418 may be configured to cause the processor to perform any suitable operations corresponding to an inter-network routing controller (e.g., the inter-network routing controller 302 of FIG. 3)

Figure 5:
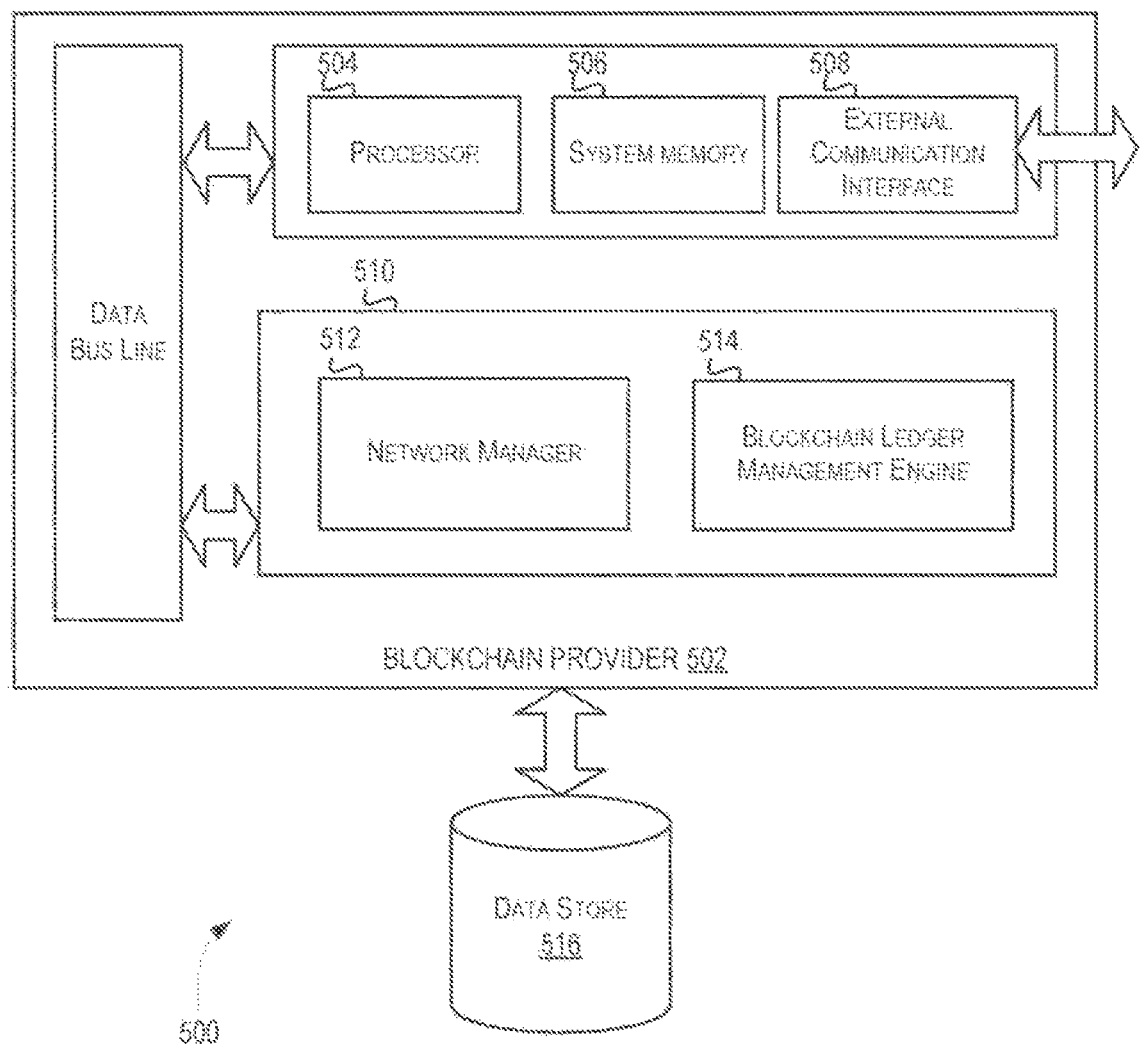
FIG. 5 depicts an illustrative example computer architecture of a blockchain provider configured maintain one or more blockchain ledgers in accordance with at least some embodiments.

FIG. 5 depicts an illustrative example computer architecture 500 of a blockchain provider 502 configured maintain one or more blockchain ledgers in accordance with at least some embodiments. A blockchain provider 402 can be configured to maintain aspects of a blockchain (e.g., one or more ledgers, etc.). It is contemplated that, in some embodiments, functionality of the blockchain provider 502 may be included as a module of the blockchain router 402 of FIG. 4

In some embodiments, the blockchain provider 502 may comprise a processor 504 (or have access to said process), which may be coupled to a system memory 506 and an external communication interface 508. A computer readable medium 510 may also be operatively coupled to the processor 504. The computer readable medium 510 may comprise any suitable combination of software modules including a network manager 512 and a blockchain ledger management engine 514. The modules of the blockchain provider 502 may be software and/or hardware modules It should be appreciated that any functionality described with respect to the modules of FIG. 5 may be combined to be performed by a single module or may be performed by a module that is external to the blockchain provider 502.

The network manager 512, a component of the blockchain provider 502, may be configured to cause the processor 504 to execute operations for joining a network (e.g., the network 104 of FIG. 1, an example overlay network for maintaining one or more blockchain ledgers). Such operations may include transmitting and receiving data messages corresponding to traditional blockchain transactions. The network manager 512 may be configured to cause the processor 404 to execute operations to discover peers within a network (e.g., the network 104). Such operations may conform to traditional technique for peer discovery within a blockchain network (e.g., the network 104).

In some embodiments, the blockchain ledger management engine 514, a component of the blockchain provider 502, may be configured to cause the processor 504 to execute operations for maintaining one or more blockchain ledgers. As described above, a "blockchain ledger" is a record of electronic transactions maintained according to a blockchain protocol. A full copy of a blockchain ledger may include every transaction ever executed within a blockchain network (e.g., the network 104 of FIG. 1). Each entry (e.g., block) in the ledger may contain a hash of the previous entry. This has the effect of creating a chain of blocks from the genesis block to a current block. Each block is guaranteed to come after the previous block chronologically because the previous block's hash would otherwise not be known. Each block is also computationally impractical to modify once it has been in the chain for a while because every block after it would also have to be regenerated. These properties make a blockchain ledger relatively secure and tamper resistant.

In some embodiments, when the functionality of the blockchain provider 502 is accessed or performed by the blockchain router 402 of FIG. 4, one or more routing tables and/or one or more forwarding tables may be maintained as a single, or separate blockchain ledgers. Accordingly, routing/forwarding tables corresponding to a routing controller may be stored as a blockchain ledger. Similarly, routing/forwarding table corresponding to an inter-network routing controller may be stored as a blockchain ledger.

In some embodiments, the blockchain ledger management engine 514 may be configured to cause the processor 504 to store any suitable combination of one or more blockchain ledgers. By way of example, the blockchain ledger management engine 514 may be configured to store a blockchain ledger in data store 516, a storage location configured to store such information. The data store 516 may exist as part of the memory 510 that is local to the blockchain provider 502 or the data store 516 may be accessible to the processor 504 but exist external to the blockchain provider 502.

In some embodiments, the blockchain ledger management engine 514, may be configured to cause the processor 504 to execute operations for transmitting/receiving data messages between blockchain providers of a distributed blockchain. A distributed blockchain can include any suitable number of blockchain providers collectively responsible for maintaining one or more blockchain ledgers.

FIG. 6 depicts a flow diagram illustrating a process 600 for managing a routing table utilizing a secure blockchain routing protocol according to some embodiments. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by the modules of FIG. 4 or the modules of FIG. 5. The code may be stored on a computer-readable storage medium, for example, in the form of a computer program including a plurality of instructions executable by one or more processors. The computer-readable storage medium may be non-transitory.

The process 600 may be performed by blockchain routers of a network 211 (e.g., the network 106 of FIG. 1). Although FIG. 6 depicts the process 600 being performed between blockchain routers, it should be appreciated that blockchain providers may be substituted for the depicted blockchain routers when the process 600 is performed with a traditional blockchain network (e.g., the network 104 of FIG. 1)

Process 600 may begin at 602, when a blockchain router (e.g., the blockchain router A, an example of a blockchain router 402 of FIG. 4) may perform operations for joining a network (e.g., the network 106). In some examples, the operations for joining a network may include performing a peer discovery process. The peer discovery process performed at 602 may refer to operations performed to discover other peers within a network. The peer discovery process may include any suitable operation for performing such a task such as referring to a list of nodes/devices from a previous connection to the network (e.g., a locally stored list or a list that is accessible to the blockchain router A), requesting and/or receiving a Domain Name Server (DNS) seed, or transmitting a request for identification to the network. In some embodiments, a DNS seed resolves to a list of IP addresses known to be running nodes. Additionally or alternative, the peer discovery process may include referring to a static, hard-coded, locally-stored peer list in order to identify one or more peers of a network.

At 604, the blockchain router A may transmit a forwarding table request message to blockchain router B. The forwarding table request message may request some or all of the forwarding information known to blockchain router B. In some embodiments, the forwarding table request may be utilized to request any suitable routing information such as routes that are currently known to blockchain router B.

At 606, the blockchain router B may consult a stored data record such as a forwarding table that stored forwarding table information corresponding to the blockchain router B. Additionally, or alternatively, the blockchain router B may provide any suitable routing information such as routes that are currently known to blockchain routing B, regardless of whether such information is formatted and/or utilized by blockchain router B as forwarding information for routing purposes.

At 608, the blockchain router B may transmit a forwarding table response message to the blockchain router A. The forwarding table response message may contain the forwarding table information corresponding to the blockchain router B. In some embodiments, the forwarding table response message may contain any suitable routing information such as routes that are currently Known to blockchain routing B, regardless of whether such information is formatted and/or utilized by blockchain router B as forwarding information for routing purposes.

At 610, the blockchain router A may transmit a forwarding table request message to blockchain router C. The forwarding table request message may request some or all of the forwarding information known to blockchain router C. In some embodiments, the forwarding table request may be utilized to request any suitable routing information such as routes that are currently known to blockchain router C.

At 612, the blockchain router C may consult a stored data record such as a forwarding table that stored forwarding table information corresponding to the blockchain router C. Additionally, or alternatively, the blockchain router C may provide any suitable routing information such as routes that are currently known to blockchain routing C, regardless of whether such information is formatted and/or utilized by blockchain router C as forwarding information for routing purposes.

At 614, the blockchain router C may transmit a forwarding table response message to the blockchain router A. The forwarding table response message may contain the forwarding table information corresponding to the blockchain router C. In some embodiments, the forwarding table response message may contain any suitable routing information such as routes that are currently known to blockchain routing C, regardless of whether such information is formatted and/or utilized by blockchain router C as forwarding information for routing purposes.

At 616, the blockchain router A may determine a routing table for a network utilizing the forwarding information received at 608 and at 614. Determining a routing table for the network may include appending the forwarding information (or other suitable routing information) to a routing table.

At 618, the blockchain router A may determine corresponding forwarding tables for any suitable combination of blockchain router A, blockchain router B, and/or blockchain router C. To determine such forwarding tables, the blockchain router A may calculate a total cost associated with each available route associated with the forwarding information received at 608 and 614. The blockchain router A may determine a single optimal route between each blockchain router in the network utilizing the calculated total costs. The blockchain router may include one or more optimal routes for each forwarding table corresponding to a particular blockchain router.

At 620, the blockchain router A may distribute one or more determined forwarding tables to the blockchain router B and/or the blockchain router C. The forwarding table distributed to blockchain router B may pretain to network neighbors of blockchain router B while the forwarding table distributed to blockchain router C may pretain to network neighbors of blockchain router C At 622, the blockchain router A may perform any additional operations including, but not limited to maintaining the determined routing table and/or one or more of the determined forwarding tables in one or more blockchain ledgers. In some embodiments, maintaining the routing table and/or one or more of the determined forwarding tables in the one or more blockchain ledgers may include transmitting/receiving information to/from the blockchain router A and other blockchain routers such that multiple blockchain routers may collectively maintain the one or more blockchain ledgers. In some embodiments, a copy of each of the one or more blockchain ledgers may be stored on each blockchain router configured to maintain such data.

It should be appreciated that any of the operations performed by blockchain router A may additionally, or alternatively, be performed by blockchain router B and/or blockchain router C.

FIG. 7 depicts a flow diagram illustrating a process 700 for performing message routing with a secure blockchain routing protocol (e.g., the extended blockchain protocol described herein) in accordance with at least some embodiments.

Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by at least the routing manager 416 and/or the inter-controller routing manager 418 of FIG. 4. The code may be stored on a computer-readable storage medium, for example, in the form of a computer program including a plurality of instructions executable by one or more processors The computer-readable storage medium may be non-transitory.

The process 700 may begin at 702, where an application running on a computing device configured to access a network may submit a task to blockchain router A via any suitable data message formatted according to the extended blockchain protocol discussed herein. The task may correspond to any suitable task for which routing functionality is required to route task information via a data message to a computing device of the network. By way of example, the task may require that the task information be sent via a data message to a particular destination (e.g., the blockchain router C). The data message may be formatted and transmitted to the blockchain router A according to the extended blockchain protocol described herein. In some examples, a destination address (e.g., corresponding to the blockchain router C) may be included in the data message transmitted to the blockchain router A may include a destination address field that specifies the destination as blockchain router C.

At 704, blockchain router A may consult a locally stored forwarding table to determine a next hop address for the data message. The next hop address may indicate a network neighbor of blockchain router A (e.g., blockchain router B) that is closer to the destination (e.g., blockchain router C). In some embodiments, the blockchain router A may request a forwarding route from another computing device configured to maintain a forwarding table corresponding to the blockchain router A.

At 706, blockchain router A may transmit the data message to another blockchain router (e.g., the blockchain router 6). In some embodiments, the blockchain router A may modify the data message prior to transmission. By way of example, the blockchain router A may modify a next hop address field within the data message to indicate that the data message is to be transmitted to blockchain router B.

At 708, blockchain router B may consult a locally stored forwarding table to determine a next hop address for the data message. The next hop address may indicate a network neighbor of blockchain router B (e.g., blockchain router C). In some embodiments, the blockchain router B may request a forwarding route from another computing device configured to maintain a forwarding table corresponding to the blockchain router B.

At 710, blockchain router B may transmit the task information to another blockchain router (e.g., the blockchain router C). In some embodiments, the blockchain router B may modify a data message prior to transmission. By way of example, the blockchain router B may modify a next hop address field to indicate that the data message is to be transmitted to blockchain router C.

At 712, blockchain router C may receive the data message, determine that it is the destination indicated in the data message, and process the data message payload. In some embodiments, the blockchain router C may perform data message processing that includes performing operations for maintaining one or more blockchain ledgers of the information contained in the data message payload. In at least one example, blockchain router C may determine that the destination address corresponds to another computing device (e.g., a blockchain provider) known to the blockchain router C. In such examples, the blockchain router C may forward the data message to the destination address of the computing device for further processing.

Embodiments of the invention provide for a number of technical advantages. For example, embodiments of the invention enable routing functionality utilizing an extended blockchain protocol. Traditional blockchain protocols do not include such routing functionality. Accordingly, the techniques described herein enable an overlay network that provides decentralized routing where the routing and/or forwarding information of the overlay network is maintained by some or all of the overlay network participants. This relieves the participants from utilizing a centralized network, such as the Internet, for message routing. Accordingly, the privacy of the data being exchanged may be guarded to a greater extent than is possible using the standard message protocols utilized by the Internet.

Additionally, in some embodiments, the techniques provided herein enable monetization of network routing and such monetary costs may be utilized to perform routing decisions. Such costs may be collected via traditional billing/payment procedures.

Additionally, in some embodiments, the techniques provided herein enable overlay network participants to provide a more secure means to transfer data messages than the security provided by the Internet as routing and/or forwarding tables may themselves by maintained within blockchain ledgers, which by their very nature, are tamper resistant.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications and descriptions mentioned above are herein incorporated by reference in their entirety for all purposes. None is admitted to be prior art.

What is claimed is:

1. A computer-implemented method for blockchain-based routing, comprising:
    receiving, by a blockchain routing node, a plurality of single-node forwarding tables from a plurality of blockchain routing nodes in accordance with an extended blockchain protocol, each of the plurality of single-node forwarding tables comprising a plurality entries comprising routes and performance data associated with the routes, the blockchain routing node participating with the plurality of blockchain routing nodes in an overlay network;
    determining, by the blockchain routing node, a routing table for the overlay network based at least on part on the plurality of single-node forwarding tables; and
    routing, by the blockchain routing node, a payload message to a destination blockchain routing node in the overlay network in accordance with the determined routing table.

2. The computer-implemented method of claim 1, further comprising:
    executing, by the blockchain routing node instructions to join the overlay network;
    identifying, by the blockchain routing node, a subset of the plurality of blockchain routing nodes from a stored data record;
    transmitting, by the blockchain routing node, a forwarding table request message to the subset of the plurality of blockchain routing nodes; and
    receiving, by the blockchain routing node, forwarding table information from at least one of the subset of the plurality of blockchain routing nodes.

3. The method of claim 2, wherein the data record is stored in local memory of the blockchain routing node.

4. The computer-implemented method of claim 2, further comprising maintaining, by the blockchain routing node, a blockchain ledger comprising entries corresponding to the routing table.

5. The computer-implemented method of claim 4, further comprising transmitting, by the blockchain routing node, a distribution message to the plurality of blockchain routing nodes, the distribution message comprising the blockchain ledger, the distribution message being formatted according to the extended blockchain protocol.

6. The computer-implemented method of claim 1, further comprising
    calculating, by the blockchain routing node, an optimal network route for routing the payload message through the overlay network to the destination blockchain routing node, the optimal network route being based at least in part on the performance data associated with respective blockchain routing nodes of the plurality of blockchain routing nodes.

7. The computer-implemented method of claim 6, wherein the performance data comprises at least a first attribute associated with a latency value and a second attribute corresponding to a cost value.

8. The computer-implemented method of claim 7, wherein the optimal network route is calculated based at least in part by multiplying the latency value by the cost value.

9. The computer-implemented method of claim 7, wherein transmitting the payload message according to the optimal network route causes a destination blockchain computing node of a different overlay network to process the payload message.

10. The computer-implemented method of claim 1, wherein the extended blockchain protocol defines at least one routing procedure that is undefined in a blockchain protocol from which the extended blockchain protocol extends.

11. A blockchain routing node comprising,
a processor, and
a computer readable medium coupled to the processor, the computer readable medium comprising code for causing the processor to:
    receive a plurality of single-node forwarding tables from a plurality of blockchain routing nodes in accordance with an extended blockchain protocol, each of the plurality of single-node forwarding tables comprising a plurality entries comprising routes and performance data associated with the routes, the blockchain routing node participating with the plurality of blockchain routing nodes in an overlay network;

determine a routing table for the overlay network based at least on part on the plurality of single-node forwarding tables; and route a payload message to a destination blockchain routing node in the overlay network in accordance with the determined routing table.

12. The blockchain routing node of claim 11, wherein the computer readable medium comprises additional code for causing the processor to:

execute instructions to join the overlay network;

identify a subset of the plurality of blockchain routing nodes from a stored data record;

transmit a forwarding table request message to the subset of the plurality of blockchain routing nodes; and receive forwarding table information from at least one of the subset of the plurality of blockchain routing nodes.

13. The blockchain routing node of claim 12, wherein the data record is stored in local memory of the blockchain routing node.

14. The blockchain routing node of claim 12, further comprising maintaining, by the blockchain routing node, a blockchain ledger comprising entries corresponding to the routing table.

15. The blockchain routing node of claim 14, wherein the computer readable medium comprises additional code for causing the processor to:

transmit a distribution message to the plurality of blockchain routing nodes, the distribution message comprising the blockchain ledger, the distribution messages being formatted according to the extended blockchain protocol.

16. The blockchain routing node of claim 11, wherein the computer readable medium comprises additional code for causing the processor to:

calculate an optimal network route for routing the payload message through the overlay network to the destination blockchain routing node, the optimal network route being based at least in part on the performance data associated with respective blockchain routing nodes of the plurality of blockchain routing nodes.

17. The blockchain routing node of claim 16, wherein the performance data comprises at least a first attribute associated with a latency value and a second attribute corresponding to a cost value.

18. The blockchain routing node of claim 17, wherein the optimal network route is calculated based at least in part by multiplying the latency value by the cost value.

19. The blockchain routing node of claim 11, wherein the extended blockchain protocol defines at least one routing procedure that is undefined in a blockchain protocol from which the extended blockchain protocol extends.

20. A system, comprising:

an overlay network comprising a plurality of blockchain routing nodes, the plurality of blockchain routing nodes individual comprising:

a processor; and a computer readable medium coupled to the processor, the computer readable medium comprising instructions that, when executed, cause the processor to:

join the overlay network comprising the plurality of blockchain routing nodes;

receive a plurality of single-node forwarding tables from at least one of the plurality of blockchain routing nodes in accordance with an extended blockchain protocol, each of the plurality of single-node forwarding tables comprising a plurality entries comprising routes and performance data associated with the routes;

determine a routing table for the overlay network based at least on part on the plurality of single-node forwarding tables; and route a payload message to a destination blockchain routing node in the overlay network in accordance with the determined routing table.

\* \* \* \* \*